United States Patent
Ono et al.

(10) Patent No.: US 10,276,044 B2
(45) Date of Patent: Apr. 30, 2019

(54) INFORMATION PROVIDING APPARATUS FOR VEHICLE

(71) Applicant: TOYOTA JIDOSHA KABUSHIKI KAISHA, Toyota-shi, Aichi-ken (JP)

(72) Inventors: Sayaka Ono, Susono (JP); Makoto Aso, Mishima (JP); Kazuki Tamura, Susono (JP); Tomoyuki Kuriyama, Hadano (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/436,172

(22) Filed: Feb. 17, 2017

(65) Prior Publication Data
US 2017/0278391 A1    Sep. 28, 2017

(30) Foreign Application Priority Data
Mar. 22, 2016    (JP) ................... 2016-056910

(51) Int. Cl.
*G08G 1/0967*    (2006.01)
*G08G 1/09*    (2006.01)
(Continued)

(52) U.S. Cl.
CPC ....... *G08G 1/096725* (2013.01); *B60W 50/14* (2013.01); *G08G 1/012* (2013.01);
(Continued)

(58) Field of Classification Search
CPC ....... G08G 1/096725; G08G 1/096716; G08G 1/0141; G08G 1/0133; G08G 1/0129;
(Continued)

(56) References Cited

U.S. PATENT DOCUMENTS 5,164,904 A * 11/1992 Sumner ............ G08G 1/096716
701/117
6,161,092 A * 12/2000 Latshaw et al. ....... G08G 1/093
701/117
(Continued)

FOREIGN PATENT DOCUMENTS

JP    2005-339181 A    12/2005
JP    2013-544695 A    12/2013
WO    2012/047743 A2    4/2012

*Primary Examiner* — Dale W Hilgendorf
(74) *Attorney, Agent, or Firm* — Sughrue Mion, PLLC

(57) ABSTRACT

An information providing apparatus includes a traffic information database and a data processing device. The data processing device detects, based on the traffic information data, an impediment event. The data processing device extracts the impediment event potentially encountered by an assisted vehicle. The data processing device calculates, based on the traffic information data, a certainty level of the impediment event. The data processing device provides a driver of the assisted vehicle with a straightforward notification regarding the impediment event potentially encountered by the assisted vehicle and having the certainty level equal to or higher than a straightforward notification threshold. The data processing device provides the driver with an euphemistic notification, which is different from the straightforward notification, regarding the impediment event potentially encountered by the assisted vehicle and having the certainty level less than the straightforward notification threshold.

15 Claims, 7 Drawing Sheets

(51) Int. Cl.
*G08G 1/01* (2006.01)
*G08G 1/0962* (2006.01)
*B60W 50/14* (2012.01)
*G08G 1/0965* (2006.01)

(52) U.S. Cl.
CPC ......... *G08G 1/0112* (2013.01); *G08G 1/0116* (2013.01); *G08G 1/0129* (2013.01); *G08G 1/0133* (2013.01); *G08G 1/0141* (2013.01); *G08G 1/093* (2013.01); *G08G 1/0962* (2013.01); *G08G 1/0965* (2013.01); *G08G 1/09675* (2013.01); *G08G 1/096716* (2013.01); *G08G 1/096741* (2013.01); *B60W 2550/10* (2013.01); *B60W 2550/20* (2013.01); *B60W 2550/40* (2013.01); *G08G 1/096775* (2013.01)

(58) Field of Classification Search
CPC .... G08G 1/0112; G08G 1/0116; G08G 1/012; G08G 1/093; G08G 1/0962; G08G 1/096741; G08G 1/09675; G08G 1/0965
See application file for complete search history.

(56) References Cited

U.S. PATENT DOCUMENTS

| | | | |
|---|---|---|---|
| 2008/0275628 A1* | 11/2008 | Xu et al. .......... | G08G 1/096716 701/117 |
| 2011/0210867 A1* | 9/2011 | Benedikt .......... | G08G 1/096716 340/905 |
| 2013/0154854 A1* | 6/2013 | Chen et al. ...... | G08G 1/096775 340/905 |
| 2017/0263121 A1* | 9/2017 | Ono et al. .......... | G08G 1/09675 |

* cited by examiner

<STRESS EVENT>

| EVENT EXAMPLE | BASIS FOR JUDGMENT | BASIS DATA |
|---|---|---|
| TAILGATING VEHICLE | HISTORY OF TAILGATING BEHAVIOR: INTER-VEHICLE DISTANCE, SPEED | UPLOADED DATA |
| SELF-PACED LOW-SPEED VEHICLE | HISTORY OF SPEED LIMITING BEHAVIOR: INTER-VEHICLE DISTANCE, SPEED, DIFFERENCE IN SPEED | |
| CUTTING-IN VEHICLE | HISTORY OF CUTTING-IN BEHAVIOR: LANE CHANGE OPERATION, CUTTING-IN BEHAVIOR | |
| HIGH-FREQUENCY BRAKING VEHICLE | HISTORY OF OPERATION: BRAKING FREQUENCY, SPEED, INTER-VEHICLE DISTANCE | |
| MANNER VIOLATION VEHICLE | HISTORY OF MANNER: TURN SIGNAL, RIGHT/LEFT TURN, STARTING/STOPPING | |
| NARROW ROAD | ROAD WIDTH, DIFFERENCE IN ROAD WIDTH | MAP DATA |

*Fig. 2*

<UNEXPECTED EVENT>

| TYPE | EVENT EXAMPLE | | BASIS DATA | DRIVER SITUATION | | |
| --- | --- | --- | --- | --- | --- | --- |
| | | | | LIVING AREA | | OUTSIDE LIVING AREA |
| | | | | ACTIVITY HOUR | OFF-ACTIVITY HOUR | |
| REGULAR EVENT | DECELERATION HUMP APPEARING AROUND BLIND CURVE | | MAP DATA | EXPECTED | EXPECTED | UNEXPECTED |
| | CHRONIC TRAFFIC CONGESTION OCCURRING AROUND BLIND CURVE | | | | | |
| HOUR EVENT | DECELERATION HUMP DURING NIGHT-TIME HOURS | | MAP DATA, TIME | | UNEXPECTED (I) | (I) |
| | CHRONIC TRAFFIC CONGESTION ON HOLIDAY | | | | | |
| | CHRONIC TRAFFIC CONGESTION DURING COMMUTING HOURS | | | | | |
| LOW FREQUENCY EVENT | OCCURRENCE TIME IS BIASED TO SPECIFIC SEASON | ANIMAL | UPLOADED DATA | UNEXPECTED (II) | (II) | (II) |
| | | POT HOLE ON ROAD | | | | |
| | OCCURRENCE INTERVAL IS LONG | DISABLED VEHICLE | | | | |
| | | FALLEN OBJECT (E.G. TIRE) | | | | |
| LOW PROBABILITY EVENT | TRAFFIC SIGNAL THAT SELDOM TURNS RED | | | (III) | (III) | EXPECTED |

*Fig. 3*

INFORMATION PROVIDING APPARATUS FOR VEHICLE

BACKGROUND

Technical Field

The present invention relates to an information providing apparatus for a vehicle. In particular, the present invention relates to an information providing apparatus for a vehicle that provides a driver of an assisted vehicle with a notification regarding an impediment event.

Background Art

Patent Literature 1 discloses a system for supporting autonomous traveling of a vehicle. A travel route of the vehicle includes not only a zone suitable for the autonomous traveling but also a zone in which the autonomous traveling is hard to carry out. For example, a general region of an expressway in which all surrounding vehicles move in the same direction to go with a flow of traffic is the zone suitable for the autonomous traveling. On the other hand, a junction where a plurality of vehicle flows merge, a roundabout intersection, a complicated grade separation and the like are the zones in which the autonomous traveling is hard to carry out.

The above-mentioned conventional system is based on premise that a driver sets a destination prior to start of the autonomous traveling. When the destination is set, the vehicle calculates a route from the current location to the destination. When the vehicle runs along the calculated route and approaches the zone in which the autonomous traveling is hard to carry out, the vehicle notifies the driver of the approach to the zone. The driver receiving the notification can supplement the autonomous traveling by setting a new route bypassing the zone or manually operating the vehicle during passing through the zone.

LIST OF RELATED ART

Patent Literature 1: JP 2013-544695 A
Patent Literature 2: JP 2005-339181 A

SUMMARY

According to the system disclosed in Patent Literature 1, the "zone in which the autonomous traveling is hard to carry out" is recorded in a map data. The following three methods are disclosed as a method for the recording.

1. It is recorded in advance at a time when the map data is generated.
2. The driver of the vehicle records it.
3. A zone provided from another vehicle through a V2V (Vehicle-to-Vehicle) communication is recorded.

In any case, only a zone that obviously exists is recorded in the map data of Patent Literature 1. Therefore, according to the system disclosed in Patent Literature 1, no notification regarding an non-existent event is provided to the driver.

An impediment event that can be impediment to vehicle running can be detected also by collecting behavior data from vehicles running in streets and analyzing the collected data. For example, if a fallen object exists on an expressway, a large number of vehicles take avoidance actions at a location of the fallen object. Therefore, if a large number of vehicles take avoidance actions at a certain location, it is possible to judge that some impediment event is occurring at that location.

From a viewpoint of assisting vehicle driving, it is considered to provide the driver with a notification regarding such the impediment event before the driver encounters the impediment event. If the driver of the vehicle receives such the notification, the driver can prepare for the impediment event and thus handle the event well in advance.

Here, when the impediment event is detected by analyzing the collected data, it is possible to judge the presence of the impediment event with higher certainty as the number of data suggesting the presence of the impediment event becomes larger. In the case of the above-mentioned example, at a time when only one vehicle takes the avoidance action, it is not possible to believe that there exists an impediment event at that location. However, if all of several tens of vehicles passing by the location take avoidance actions, it is possible to judge that an impediment event is almost certainly occurring.

From a viewpoint of emphasizing assistance for the driver, it may be desirable to notify the driver of the possible impediment event at a stage of low certainty level. However, if misinformation occurs frequently, the driver trusts the notification less and finds the notification more annoying. On the other hand, if the notification is not provided until sufficient certainly level is obtained from a viewpoint of emphasizing reliability of the notification, the driver is more likely to encounter the impediment event without receiving the notification. Thus, when detecting the impediment event through the data analysis and providing the notification regarding the impediment event, it is not always easy to ensure both the reliability of the notification and effectiveness of the assistance.

The present invention has been made to solve the problem described above. An object of the present invention is to provide an information providing apparatus for a vehicle that can provide a driver of an assisted vehicle with a notification regarding an impediment event with high effectiveness and without deteriorating reliability of the notification.

A first embodiment has the following features in order to achieve the object described above. The first embodiment is an information providing apparatus for a vehicle, including:

a traffic information database in which traffic information data are recorded; and a data processing device configured to process the traffic information data to provide a driver of an assisted vehicle with a notification.

The data processing device is configured to execute:

an event detection process that detects, based on the traffic information data, an impediment event that impediments vehicle running;

an event extraction process that extracts the impediment event potentially encountered by the assisted vehicle;

a certainty level calculation process that calculates, based on the traffic information data, a certainty level of the impediment event;

a straightforward notification process that provides the driver with a straightforward notification regarding the impediment event potentially encountered by the assisted vehicle and having the certainty level equal to or higher than a straightforward notification threshold; and an euphemistic notification process that provides the driver with an euphemistic notification, which is different from the straightforward notification, regarding the impediment event potentially encountered by the assisted vehicle and having the certainty level less than the straightforward notification threshold.

A second embodiment has the following features in the first embodiment.

The data processing device is further configured to execute a traffic information recording process that records, in the traffic information database, the traffic information data received from an information providing vehicle.

A third embodiment has the following features in the second embodiment.

The traffic information data includes: positional information of the information providing vehicle; and vehicle behavior information of the information providing vehicle.

A fourth embodiment has the following features in the second or third embodiment.

The traffic information data includes: positional information of the information providing vehicle; and a result of detection by a surrounding monitoring sensor that is installed in the information providing vehicle for monitoring a surrounding situation.

A fifth embodiment has the following features in any one of the first to fourth embodiments.

The data processing device is further configured to execute a determination value calculation process that calculates a notification necessity level for each of the impediment event.

The straightforward notification process and the euphemistic notification process respectively provide the driver with the straightforward notification and the euphemistic notification regarding the impediment event having the notification necessity level greater than a notification threshold.

A sixth embodiment has the following features in any one of the first to fifth embodiments.

The euphemistic notification includes a phrase being words of wisdom or lines by a real or imaginary person or character and reminiscent of the impediment event to be notified.

A seventh embodiment has the following feature in the sixth embodiment.

The words of wisdom or lines include a quote from anime, movies, dramas, speeches, or buzz-words.

An eighth embodiment has the following feature in the sixth or seventh embodiment.

The information providing apparatus further includes:

a straightforward database in which data of the straightforward notification for each of a plurality of impediment events are recorded; and an euphemistic database in which data of the euphemistic notification for each of the plurality of impediment events are recorded.

The straightforward notification process includes:

a process of reading, from the straightforward database, the data associated with the impediment event to be notified; and a process of notifying the driver of the straightforward notification based on the read data.

The euphemistic notification process includes:

a read process of reading, from the euphemistic database, the data associated with the impediment event to be notified; and a notification process of notifying the driver of the euphemistic notification based on the read data.

A ninth embodiment has the following feature in the eighth embodiment.

In the euphemistic database, a set of the data of the euphemistic notification associated with the plurality of impediment events is recorded for each of a plurality of themes.

The data processing device is further configured to execute a reception process that receives a desired theme among the plurality of themes that is desired by the driver.

The read process includes a process of reading the data associated with the impediment event from the set of the data associated with the desired theme.

A tenth embodiment has the following feature in the ninth embodiment.

The assisted vehicle includes a storage device configured to store the set of the data associated with the desired theme that is downloaded from the euphemistic database.

The read process and the notification process are executed in the assisted vehicle.

According to the first embodiment, it is possible to provide the driver with the straightforward notification regarding the impediment event whose certainty level is high. Moreover, it is possible to provide the driver with the euphemistic notification regarding the impediment event whose certainty level is low. The driver who receives the euphemistic notification can understand that the certainty level of the impediment event is low, because the received notification is not the straightforward notification. Therefore, even if the notification of the impediment event results in misinformation, it is possible to avoid losing the driver's confidence in the notification.

According to the second invention, the data processing device can obtain the traffic information data from the information providing vehicle and records the obtained traffic information data in the traffic information database. The information providing vehicle preceding the assisted vehicle can transmit, to the data processing device, information of the impediment event occurring on a travel route of the assisted vehicle. Accordingly, the data processing device can provide the assisted vehicle with the notification regarding the impediment event with which the assisted vehicle does not yet encounter.

According to the third invention, the information providing vehicle transmits its positional information and vehicle behavior information as the traffic information data. The data processing device can recognize occurrence of the impediment event by referring to the vehicle behavior information indicating an avoidance action for example. Moreover, the data processing device can recognize a position of occurrence of the impediment event by referring to the positional information of the information providing vehicle. Therefore, according to the third invention, it is possible to notify the assisted vehicle of the information regarding the impediment event encountered by the information providing vehicle in real time.

According to the fourth invention, the information providing vehicle transmits its positional information and the result of detection by the surrounding monitoring sensor as the traffic information data. The data processing device can detect, based on the result of detection by the surrounding monitoring sensor, the impediment event that occurs around the information providing vehicle. Moreover, the data processing device can recognize a position of occurrence of the impediment event by referring to the positional information of the information providing vehicle. Therefore, according to the fourth invention, it is possible to notify the assisted vehicle of the details of the impediment event encountered by the information providing vehicle in real time.

According to the fifth invention, it is possible to provide the driver with only the notification regarding the impediment event whose notification necessity level is high. Therefore, according to the fifth invention, it is possible to suppress possibility that the driver finds the received notification annoying.

According to the sixth invention, when the certainly level of the impediment event is low, the words of wisdom or lines by a character or the like can put the driver in mind of the impediment event. Using the words of wisdom or lines can add amusement to the notification. Therefore, according to the sixth invention, it is possible to reduce the annoyance of the driver even when the notification results in misinformation.

According to the seventh invention, a high level of amusement can be given to the words of wisdom or lines. Therefore, according to the seventh invention, it is possible to entertain the driver by the notification, regardless of misinformation.

According to the eighth invention, the data is read out from the straightforward database or the euphemistic database. Therefore, it is possible to easily generate the straightforward notification or the euphemistic notification suitable for the impediment event.

According to the ninth invention, a set of the data for each theme is recorded in the euphemistic database, and the euphemistic notification can be generated from the data associated with a theme desired by the driver. Therefore, according to the ninth invention, it is possible to add a high level of amusement appropriate to the driver's preference to the euphemistic notification.

According to the tenth invention, the data associated with the theme desired by the driver can be downloaded and stored in the storage device of the assisted vehicle.

Therefore, according to the tenth invention, it is possible to provide the driver with the euphemistic notification having the high level of amusement at an appropriate timing without a time lag.

BRIEF DESCRIPTION OF DRAWINGS

FIG. 2 is a diagram showing concrete examples of a stress event shown in FIG. 1;

FIG. 3 is a diagram showing concrete examples of an unexpected event shown in FIG. 1;

EMBODIMENTS

[Overview of Embodiments of Present Invention]

An object of embodiments of the present invention is to assist a driver of a vehicle through provision of information. The vehicle as an assistance target is hereinafter referred to as an "assisted vehicle". Various events occur on a travel route of the assisted vehicle. The various events include a stress event, an unexpected event, and an expected event. The stress event is an event that gives great stress to the driver encountering the event and is exemplified by another vehicle having a tendency to tailgate and another vehicle having a tendency to frequently apply a brake. The unexpected event is exemplified by a separated wheel that cannot be recognized until just before encounter. The expected event is exemplified by a usual traffic congestion that occurs everyday.

In general, the driver notified of assistance information welcomes a notification of useful information but finds a notification of useless information annoying. Specifically, notifications of the stress event and the unexpected event among the above-mentioned examples are likely to be welcomed by the driver. On the other hand, the expected event is already known by the driver and thus a notification of the expected event is likely to be annoying. Therefore, according to the embodiments of the present invention, an event to be notified to the driver of the assisted vehicle is limited to the stress event and the unexpected event among the above-mentioned examples, while the expected event is eliminated from the event to be notified. It should be noted that the stress event and the unexpected event are just examples of the event to be notified. An event having a high level of notification necessity also can be appropriately added to the event to be notified.

Figure 1:
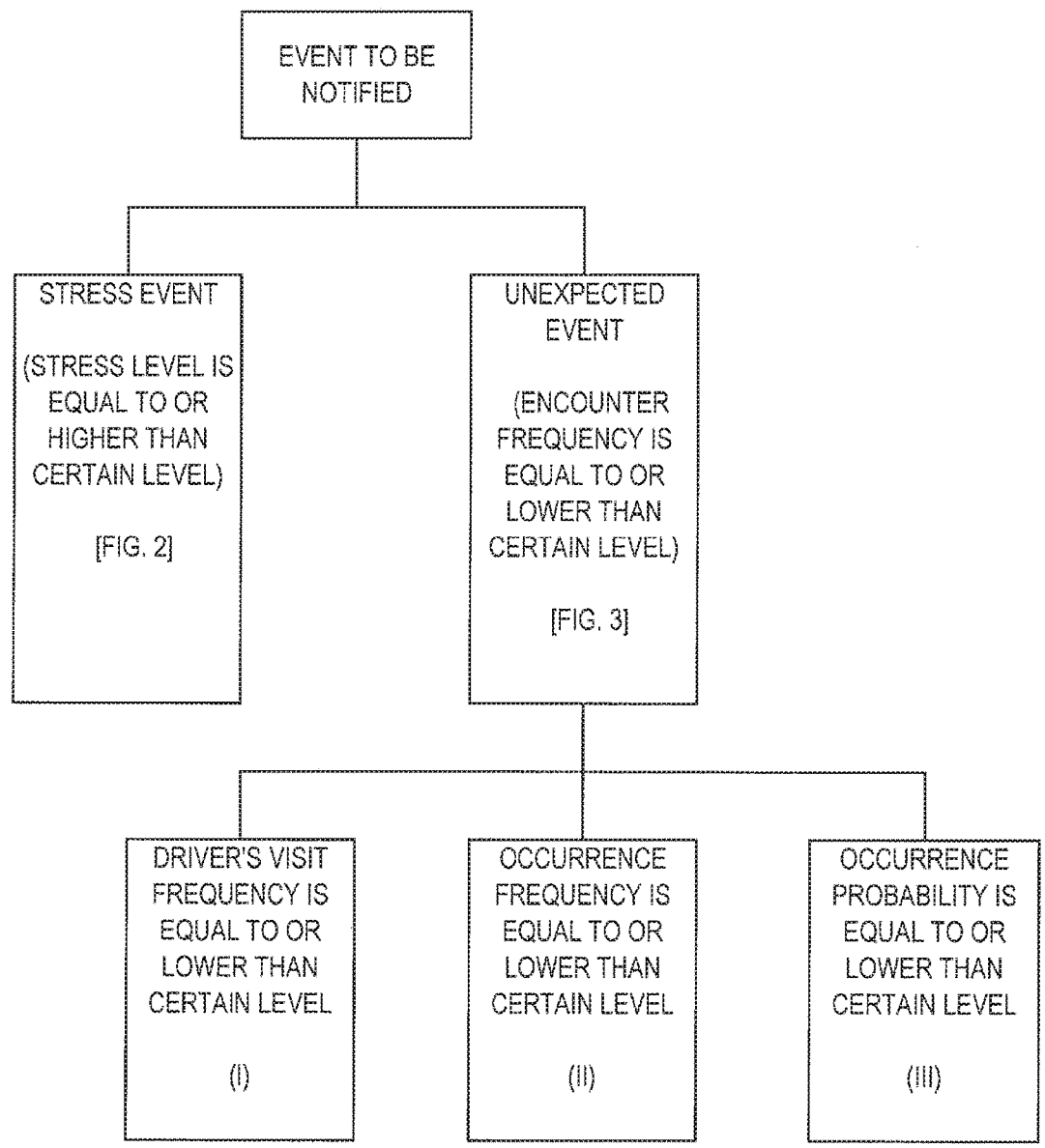
FIG. 1 is a diagram for explaining an overview of an event to be notified to a driver of an assisted vehicle in the present invention.

FIG. 1 is a diagram for explaining an overview of the event to be notified in the embodiments of the present invention. According to the embodiments of the present invention, as shown in FIG. 1, the event to be notified consists of the stress event and the unexpected event. Details of the event to be notified will be described hereinafter with reference to FIGS. 2 and 3 together with FIG. 1.

FIG. 2 is a diagram for explaining concrete examples of the stress event.

A first concrete example is a "tailgating vehicle".
(Definition)
The "tailgating vehicle" refers to a vehicle that frequently performs a tailgating behavior that closes a distance to a preceding vehicle to urge the preceding vehicle.
(Basis for Judgment)
Whether or not a vehicle meets the definition of the "tailgating vehicle" can be judged based on a history of the tailgating behavior of the vehicle. Whether or not a vehicle is performing the tailgating behavior can be judged based on speeds of the vehicle and the preceding vehicle, a distance between the vehicle and the preceding vehicle, and so forth.
(Basis Data)
The judgment regarding the tailgating behavior can be performed based on uploaded data from the vehicle such as positional information, speed information, and inter-vehicle distance information.

A second concrete example is a "self-paced low-speed vehicle".
(Definition)
The "self-paced low-speed vehicle" refers to a vehicle that keeps on running at an obviously lower speed than surrounding or following vehicles.
(Basis for Judgment)
Whether or not a vehicle meets the definition of the "self-paced low-speed vehicle" can be judged based on a history of a speed limiting behavior that limits a speed of a following vehicle group under a condition that there is no preceding vehicle. Whether or not a vehicle is performing the speed limiting behavior can be judged based on distances between the vehicle and the preceding and following vehicles, a speed of the vehicle, differences in the speed between the vehicle and the surrounding vehicles, a difference in the speed between the vehicle and the following vehicle until the following vehicle closes the distance, the number of following vehicles, and so forth.

(Basis data)

The judgment regarding the speed limiting behavior can be performed based on uploaded data from the vehicle such as the positional information, the speed information, and the inter-vehicle distance information.

A third concrete example is a "cutting-in vehicle".

(Definition)

The "cutting-in vehicle" refers to a vehicle that frequently performs a cutting-in behavior that cuts in between vehicles in a lane adjacent to the running lane.

(Basis for judgment)

Whether or not a vehicle meets the definition of the "cutting-in vehicle" can be judged based on a history of the cutting-in behavior of the vehicle. Whether or not a vehicle is performing the cutting-in behavior can be judged based on a lane change operation in the vehicle, a behavior of a nearby vehicle in the adjacent lane, and so forth.

(Basis data)

The lane change operation can be detected based on uploaded data from the vehicle such as steering information, accelerator operation information, brake operation information, the positional information, and the speed information. The behavior of the nearby vehicle due to the cutting-in can be detected based on uploaded data from the nearby vehicle such as positional information, vehicle speed information, and inter-vehicle distance information.

A fourth concrete example is a "high-frequency braking vehicle".

(Definition)

The "high-frequency braking vehicle" refers to a vehicle that frequently performs a brake operation. Such the frequent brake operation is likely to be performed by a driver having a tendency to drive the vehicle with closing the distance to the preceding vehicle. When a vehicle follows the high-frequency braking vehicle, a driver of the following vehicle is likely to feel stress because the driver needs to frequently pay attention to the brake operation of the preceding vehicle.

(Basis for judgment)

Whether or not a vehicle meets the definition of the "high-frequency braking vehicle" can be judged based on a history of operations in the vehicle. More specifically, whether or not a vehicle meets the definition of the "high-frequency braking vehicle" can be judged based on a frequency of the brake operation in the vehicle, a vehicle speed at the time when the brake operation is performed, the distance to the preceding vehicle, and so forth.

(Basis data)

The above-mentioned judgment can be performed based on uploaded data from the vehicle such as the brake operation information, the positional information, the speed information, and the inter-vehicle distance information.

A fifth concrete example is a "manner violation vehicle".

(Definition)

The "manner violation vehicle" refers to a vehicle that frequently repeats a manner violation behavior. Here, the "manner violation behavior" is exemplified by a right or left turn without giving a turn signal, stop on a side of a road, start from the side of the road, and so forth.

(Basis for judgment)

Whether or not a vehicle meets the definition of the "manner violation vehicle" can be judged based on a history of the manner violation behavior of the vehicle. The "manner violation behavior" can be detected based on operations in the vehicle such as a turn signal operation, a right or left turn operation, an operation of stopping on the side of the road, and an operation of starting from the side of the road.

(Basis data)

The above-mentioned detection can be performed based on uploaded data from the vehicle such as a variety of operation information, the positional information, the speed information, and the inter-vehicle distance information.

A sixth concrete example is a "narrow road".

(Definition)

The "narrow road" refers to a road whose width is narrow. At an entrance to the narrow road, a driver is likely to feel stress due to decrease in the road width. Moreover, during driving through the narrow road, the driver needs to pay a great deal of attention to the road width and is thus likely to feel stress.

(Basis for judgment)

Whether the vehicle approaches the narrow road can be judged based on the road width or a difference in the road width.

(Basis data)

The above-mentioned judgment can be performed based on map data that is prepared in advance.

Referring back to FIG. 1, the "unexpected event" in the embodiments of the present invention will be described next. In the embodiments of the present invention, the "unexpected event" refers to the impediment event whose frequency of encounter by the driver is equal to or less than a certain level. The impediment event whose frequency of encounter is equal to or lower than a certain level can be classified into three categories (I), (II), and (III) as shown in FIG. 1.

The first category (I) includes the following impediment event; that is, a frequency of visit by the driver to a location of occurrence of the impediment event is equal to or lower than a certain level, and accordingly the frequency of encounter with the impediment event is low. Specifically, the impediment event itself occurs steadily or frequently, but the driver seldom visits the location of occurrence of the impediment event.

The second category (II) includes the impediment event whose frequency of occurrence is equal to or lower than a certain level. The impediment event belonging to the category (II) can be further classified into the following two categories.

(II-i) The impediment event whose occurrence time is biased to a certain time. In other words, the impediment event whose period of occurrence within a defined period of time is less than a threshold. For example, a deer appearing only during a certain season corresponds to this category.

(II-ii) The impediment event whose number of occurrences within a defined period of time is less than a threshold. Or, the impediment event whose interval of occurrence (i.e. an elapsed time from the previous occurrence) at the location of occurrence is equal to or more than a threshold. For example, a separated wheel left on a lane of an expressway corresponds to this category.

The third category (III) includes the impediment event whose frequency of occurrence is not so low but whose probability of occurrence is lower than a threshold. For example, a traffic signal that seldom turns red corresponds to this category.

FIG. 3 is a diagram for explaining concrete examples of the unexpected event. In FIG. 3, the unexpected event is classified into four types depending on characteristics.

A first type is a "regular event". The regular event is the impediment event that is always present at a specific location.

(Event Example)

For example, a deceleration hump appearing around a blind curve, and a chronic traffic congestion occurring around a blind curve belong to the first type.

(Basis Data)

This type of event can be detected based on uploaded data from individual vehicles and a traffic information infrastructure. Alternatively, this type of event, which is always present at a specific location, can also be detected based on a map data in which its information is registered. The vehicle and infrastructure that upload the data are hereinafter collectively referred to as "information providing vehicle and the like".

(Driver Situation)

The regular event is a daily event for a driver whose living area includes a location of occurrence of the regular event. Therefore, in a case where the target of assistance is the driver within the living area, it is reasonable to treat the regular event as the expected event. On the other hand, the regular event is not a daily event for a driver outside the living area such as a driver who visits the location of occurrence of the regular event during the trip. Therefore, according to the embodiments of the present invention, the regular event is treated as the unexpected event for the driver outside the living area. This treatment corresponds to the category (I) shown in FIG. 1.

A second type shown in FIG. 3 is an "hour event". The hour event is the impediment event that routinely occurs at a specific location during specific hours.

(Event Example)

For example, a deceleration hump that can be easily seen from a long distance during daytime hours but is hard to recognize and thus becomes the impediment event during night-time hours, chronic traffic congestion that occurs at a specific location only on a holiday, and chronic traffic congestion that occurs at a specific location only during commuting hours belong to the second type.

(Basis Data)

The hour event fixed on a road such as the deceleration hump can be detected based on time information and the uploaded data from the information providing vehicle and the like or the map data in which information of the hour event fixed on the road is registered. On the other hand, the hour event such as the chronic traffic congestion can be detected based on the uploaded data from the information providing vehicle and the like.

(Driver Situation)

The hour event is a daily event for a driver whose living area includes a location of occurrence of the hour event and whose activity hour (i.e. time of visit to the location of occurrence) overlaps an hour of occurrence of the hour event. Therefore, with respect to the driver whose living area and activity hour respectively overlap the location of occurrence and the hour of occurrence of the hour event, it is reasonable to treat the hour event as the expected event. On the other hand, the hour event is not a daily event for a driver whose living area includes the location of occurrence of the hour event but whose activity hour does not overlap the hour of occurrence of the hour event. Similarly, the hour event is not a daily event for a driver outside the living area. Therefore, according to the embodiments of the present invention, the hour event is treated as the unexpected event for the driver during off-activity hour and the driver outside the living area. This treatment corresponds to the category (I) shown in FIG. 1.

A third type shown in FIG. 3 is a "low frequency event". The "low frequency event" corresponds to the impediment event that belongs to the category (II) shown in FIG. 1.

(Event Example)

For example, an animal (typically, a deer) that appears intensively during a certain season, and a pot hole that appears on a road intensively at a thawing season belong to the third type (especially the above-mentioned category (II-i)). Moreover, a disabled vehicle stopping on a road, and a separated wheel left on an expressway also belong to the third type (especially the above-mentioned category (II-ii)).

(Basis Data)

The impediment event belonging to the low frequency event can be detected based on the uploaded data from the information providing vehicle and the like.

(Driver Situation)

The low frequency event is not a daily event for any driver. Therefore, according to the embodiments of the present invention, the low frequency event is treated as the unexpected event for all the drivers.

A fourth type shown in FIG. 3 is a "low probability event". The "low probability event" corresponds to the impediment event that belongs to the category (III) shown in FIG. 1. More specifically, the low probability event refers to the impediment event that is realized with an extremely low probability in an on-road fixed object installed at a specific location. The on-road fixed object belongs to a population consisting of a large number of the same kind of on-road fixed objects. Each of the on-road fixed objects belonging to the population operates to switch its state between a plurality of states. One of the plurality of states causes the impediment event that impediments the vehicle running. Since the large number of on-road fixed objects belonging to the population behave in a similar manner, the driver understands that each of the on-road fixed objects can cause the impediment event with a certain probability. Under the circumstances, let us consider a case where only a specific on-road fixed object operates to cause the impediment event with a remarkably lower probability as compared with other on-road fixed objects. In this case, a driver familiar with the operation of the specific on-road fixed object comes to have a preconceived idea that the specific on-road fixed object would not cause the impediment event. Under this situation, the impediment event caused by the specific on-road fixed object is the unexpected event for the driver.

(Event Example)

For example, a vehicle actuated traffic signal that is installed on a highway and seldom turns red belongs to the fourth type.

(Basis Data)

The impediment event belonging to the low probability event can be detected based on the uploaded data from the information providing vehicle and the like (including the on-road fixed object itself).

(Driver Situation)

The low probability event is the unexpected event for the driver having the preconceived idea that the specific on-road fixed object seldom causes the impediment event. However, the low probability event may be an expected event for the driver outside the living area who does not have such the preconceived idea. Therefore, according to the embodiments of the present invention, the low probability event may be excluded from the unexpected event in the case of the driver outside the living area, although the low probability event is treated as the unexpected event at least for the driver within the living area.

[Certainty Level of Impediment Event]

As described above, many of the "stress events" are detected by analyzing the uploaded data from the vehicles. Also, many of the "unexpected events" are detected based on the uploaded data from the information providing vehicle and the like. A data processing device that analyzes the uploaded data can judge presence of the event with a higher certainty level as the number of data indicating the presence of the event becomes larger.

Regarding the impediment event such as the tailgating vehicle, as a certain vehicle repeats the tailgating behavior, the number of data indicating that the certain vehicle is the tailgating vehicle becomes larger. In this case, when a sufficient number of data is collected, it is possible to notify, with certainty, the assisted vehicle of the presence of the tailgating vehicle. However, when the number of data is not sufficient yet, it is not possible to provide the notification with certainty.

Regarding the impediment event such as the separated wheel, as an elapsed time from its occurrence becomes longer, the number of data suggesting the presence of the event becomes larger. In this case, after a sufficient time has passed, it is generally possible to notify the occurrence of the impediment event with certainty. However, at a time immediately after the occurrence, it is not possible to notify the presence of the event with certainty.

The notification provided at a time when the certainly level becomes high is less likely to result in misinformation. As the correct notification is repeated, the driver's confidence in the notification is increased gradually. On the other hand, the notification whose certainty level is low results in misinformation with a certain degree of probability. Therefore, when such the notification is provided, some misinformation is mixed into notifications. In general, the driver finds the misinformation annoying. Moreover, if the misinformation is provided repeatedly, the confidence in the notification itself is lost. From this point of view, it may be desirable to notify the driver of only the event whose certainty level is high.

However, when an object of the notification is limited to the impediment event whose certainty level is high, a newly-occurred event is excluded from the object of the notification. In this case, there is a possibility that the driver encounters the impediment event without receiving any notification. Such the lack of the notification not only causes reduction of the driver's confidence in the assistance but also violates the object of the assistance that prompts the driver to prepare for the impediment event in advance.

In view of the above, according to the embodiment of the present invention, a method of notification is varied depending on whether the certainty level is high or low, and the driver is notified of the stress event and the unexpected event in either case. More specifically, in the two cases, the notification regarding the impediment event is provided by the following methods, respectively.

1. In the case where the certainty level is high (Type of notification) Straightforward notification (i.e. notification that represents presence, contents and the like of the impediment event in a straightforward manner)

(Example) "There is xx about ○○ meters down this road"

2. In the case where the certainty level is low (Type of notification) Euphemistic notification (i.e. notification based on an euphemistic representation reminiscent of the impediment event)

(Example) "One must always plan a few steps ahead in battle" (words of Char Aznable from Mobile Suit Gundam)

The straightforward notification used in the embodiment of the present invention makes a definitive statement of the presence and contents of the impediment event. Therefore, the driver receiving the straightforward notification recognizes that the impediment event definitely exists. On the other hand, the euphemistic notification used in the embodiment of the present invention does not make a definitive statement of the presence and contents of the impediment event. Therefore, the driver receiving the euphemistic notification can understand that the presence of the impediment event is not yet confirmed. Furthermore, when the euphemistic notification is provided by using lines from a famous anime and the like, the driver can have fun with the notification itself as amusement. Therefore, according to the embodiment of the present invention, it is possible to appropriately provide the driver with the notification regarding the impediment event whose certainly level is low, without causing the driver to find the misinformation annoying.

First Embodiment

[Configuration of First Embodiment]

Figure 4:
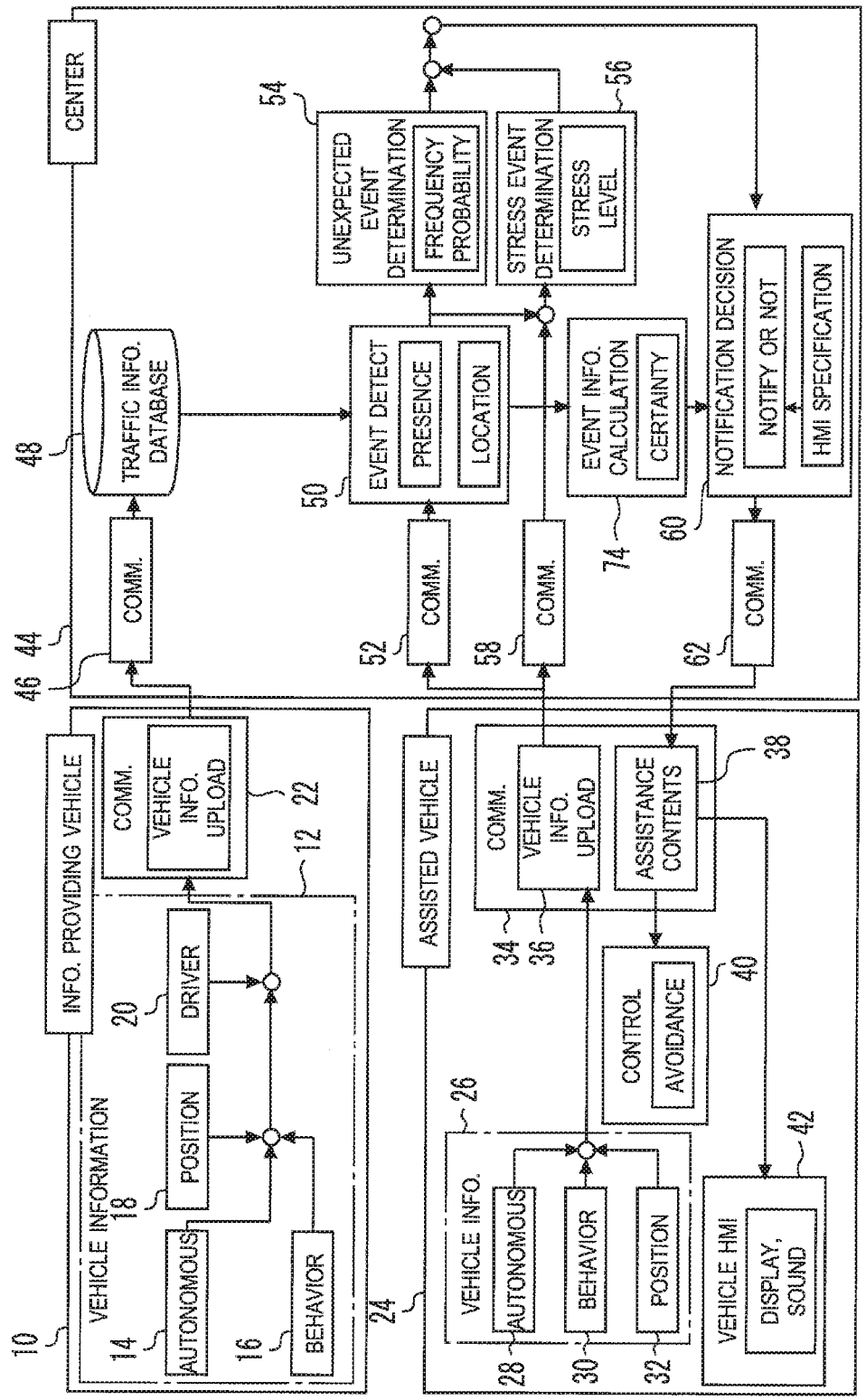
FIG. 4 is a block diagram for explaining a configuration of a first embodiment of the present invention.

FIG. 4 is a diagram for explaining a configuration of an information providing apparatus for a vehicle according to a first embodiment of the present invention. As shown in FIG. 4, a system of the present embodiment includes an information providing vehicle 10. Although a single information providing vehicle 10 only is shown in FIG. 4 for the sake of convenience, there are practically a lot of information providing vehicles 10. In the present system, the information providing vehicle 10 plays a role of a supply source of a variety of information obtained on a road. An information supply source in the present embodiment includes not only the information providing vehicle 10 but also various infrastructures such as a sensor for detecting amount of traffic and a monitoring camera (not shown) that can obtain traffic information. The information providing vehicle 10 and those infrastructures are hereinafter collectively referred to as "information providing vehicle and the like".

The information providing vehicle 10 has a vehicle information unit 12. The vehicle information unit 12 is a unit that obtains a variety of information regarding the information providing vehicle 10. The vehicle information unit 12 includes an autonomous sensor unit 14. The autonomous sensor unit 14 includes a surrounding monitoring sensor for detecting information required for autonomous traveling of the information providing vehicle 10. More specifically, the autonomous sensor unit 14 includes surrounding monitoring sensors such as a millimeter-wave radar, a laser radar, an on-vehicle camera. By using the millimeter-wave radar and the laser radar, it is possible to detect presence of objects including other vehicles, distances to the objects, and so forth. By using the on-vehicle camera, it is possible to recognize white lines, pedestrians, bicycles and so forth on the road.

The vehicle information unit 12 further includes a vehicle behavior unit 16. The vehicle behavior unit 16 includes a variety of sensors for detecting a behavior of the information providing vehicle 10. For example, the vehicle behavior unit 16 can detect a speed, an acceleration, a yaw rate, an accelerator opening, a brake oil pressure, a steering angle, a steering angular velocity, and so forth.

The vehicle information unit 12 further includes a positional information unit 18. The positional information unit 18 includes a GPS (Global Positioning System) device. By using the positional information unit 18, it is possible to detect a position of the information providing vehicle 10.

The vehicle information unit 12 further includes a driver information unit 20. The driver information unit 20 includes an input interface for receiving driving skill information self-reported by a driver or a unit for diagnosing a driving skill of the driver. Here, the driving skill of the driver can be judged by a well known method based, for example, on a jerk of the vehicle, namely a differential value da/dt of the acceleration a. Moreover, the driver information unit 20 includes an input interface for receiving various settings and requests from the driver.

A variety of vehicle information detected by the vehicle information unit 12 is supplied to the communication unit 22. The communication unit 22 has a communication function for uploading the vehicle information.

The system of the present embodiment further includes an assisted vehicle 24 in addition to the above-described information providing vehicle 10. The assisted vehicle 24 has a vehicle information unit 26 for detecting information regarding the assisted vehicle 24. In the present embodiment, the vehicle information unit 26 of the assisted vehicle 24 includes an autonomous sensor unit 28, a vehicle behavior unit 30, and a positional information unit 32. These functions are similar to those of the information providing vehicle 10, and an overlapping description thereof is omitted here.

The assisted vehicle 24 has a communication unit 34 that receives detected information supplied from the vehicle information unit 26. The communication unit 34 includes a vehicle information upload unit 36 for uploading a variety of detected information received from the vehicle information unit 26 to the outside of the assisted vehicle 24. Moreover, the communication unit 34 includes an assistance contents reception unit 38 for receiving assistance contents supplied from the outside of the assisted vehicle 24.

The assistance contents that the assistance contents reception unit 38 externally receives include an avoidance control instruction and a notification instruction. The avoidance control instruction is supplied to a control unit 40 of the assisted vehicle 24. The control unit 40 has a function of achieving a variety of avoidance controls in accordance with the avoidance control instruction. Here, the avoidance control refers to a control that controls a driving force, a braking forth of each wheel, a steering angle and the like to cause the assisted vehicle 24 to take necessary actions for avoiding the impediment event.

The notification instruction is supplied from the assistance contents reception unit 38 to a vehicle HMI (Human Machine Interface) unit 42. The vehicle HMI unit 42 is an interface for notifying the driver of the assisted vehicle 24 of the instructed notification. More specifically, the vehicle HMI unit 42 executes display/sound/audio control for proving the driver with the notification through display, sound, and audio.

The system of the present embodiment further includes a center 44 that processes the uploaded data from the information providing vehicle and the like and the assisted vehicle 24, and provides the assisted vehicle 24 with the assistance contents. The center 44 has a storage device, a processor, an input-output interface, a communication device and so forth.

More specifically, the center 44 includes a communication unit 46 that receives the uploaded data from the information providing vehicle and the like. The data received by the communication unit 46 are recorded in a traffic information database 48. Specifically, the following two kinds of traffic information data are uploaded to the traffic information database 48.

1. Data regarding the driver of the information providing vehicle 10

(Contents) The driver skill that is self-reported or diagnosed.

The settings by the driver and the requests from the driver

2. Data regarding the impediment event.

(Contents) "Event data" indicating an event whose presence and details are identified based on images obtained by the on-vehicle camera and the like.

"Base data" used for determining presence and details of an event, such as the vehicle behavior of the information providing vehicle 10 and a result of measurement by the millimeter-wave radar.

"Positional information" indicating a location of occurrence of the information.

The data accumulated in the traffic information database 48 are supplied to an event detection unit 50 of the center 44. The event detection unit 50 performs the following processing based on the above-mentioned 2. "data regarding the impediment event".

(1) detecting, based on the above-mentioned "event data", the impediment event.

(2) detecting, based on the above-mentioned "base data", an event that can be estimated to be the impediment event (this kind of event also is hereinafter referred to as the "impediment event").

(3) identifying, based on the above-mentioned "positional information", a location of each impediment event detected by the above-mentioned Steps (1) and (2).

The positional information of the assisted vehicle 24 also is supplied to the event detection unit 50 through a communication unit 52. The event detection unit 50 further performs the following processing based on the positional information.

(4) estimating a travel route of the assisted vehicle 24.

(5) extracting the impediment event existing on the travel route estimated by the above-mentioned Step (4) from the impediment events whose locations are identified by the above-mentioned Step (3).

By performing the above-described processing (1) to (5), the event detection unit 50 can detect the impediment event which the assisted vehicle 24 is likely to encounter from now.

The data regarding the impediment event detected by the event detection unit 50 is supplied to an unexpected event determination unit 54. The unexpected event determination unit 54 executes a frequency determination process and a probability determination process in order to determine whether or not the impediment event corresponds to an unexpected event. In the frequency determination process, it is determined whether or not the event detected by the event detection unit 50 corresponds to an event whose occurrence frequency is low, namely, the event belonging to the category (II) shown in FIG. 1, that is, the "low frequency event" shown in FIG. 3. On the other hand, in the probability determination process, it is determined whether or not the event detected by the event detection unit 50 corresponds to an event whose occurrence probability is low, namely, the event belonging to the category (III) shown in FIG. 1, that is, the "low probability event" shown in FIG. 3.

A large number of data regarding the impediment events are accumulated in the center 44. Moreover, a threshold used for determining whether the impediment event is the low frequency event and a threshold used for determining whether the impediment event is the low probability event are stored in the center 44. The threshold is a limit value of the occurrence frequency or the occurrence probability that a general driver feels the determination-target event unexpected. The unexpected event determination unit 54 analyzes a large number of data to calculate the occurrence frequency and the occurrence probability of the impediment event being the determination-target event, and then compares the occurrence frequency and the occurrence probability with the above-mentioned thresholds, respectively, to execute the frequency determination process and the probability determination process.

The data regarding the impediment event detected by the event detection unit 50 is supplied also to a stress event determination unit 56. The uploaded data from the assisted vehicle 24 also is supplied to the stress event determination unit 56 through a communication unit 58. The stress event determination unit 56 executes a stress level determination process that determines whether or not the event detected by the event detection unit 50 corresponds to the stress event (see FIGS. 1 and 2) for the assisted vehicle 24.

Various rules (maps and the like) for calculating a stress level for each impediment event are stored in the center 44. For example, regarding the "tailgating vehicle", a rule for calculating the stress level based on parameters such as a frequency of tailgating by the tailgating vehicle, degree of tailgating (calculated based on the speed and the inter-vehicle distance), and a distance between the tailgating vehicle and the assisted vehicle 24 is stored. Regarding the "self-paced low-speed vehicle" and the "cutting-in vehicle", a rule for calculating the stress level based on parameters such as a frequency of the impediment action by the vehicle, degree of the impediment action, and a distance between the vehicle and the assisted vehicle 24 is stored. Regarding the on-road fixed object such as the narrow road, a rule for calculating the stress level based on a map data including parameters such as a road width, a difference in the road width at a position where the road width changes, presence or absence of a guardrail is stored. Furthermore, a threshold being a limit value of the stress level that a general driver feels intolerable is stored in the center 44. The stress event determination unit 56 calculates the stress level of each event and compares the calculated stress level with the above-mentioned threshold to execute the stress level determination process.

Furthermore, the data regarding the impediment event detected by the event detection unit 50 is supplied also to an event information calculation unit 74. The event information calculation unit 74 executes a certainty level calculation process with respect to each impediment event provided. The data uploaded from the information providing vehicle and the like to the center 44 include not only data regarding an event confirmed by the on-vehicle camera and the like but also data regarding an event that is not yet confirmed (e.g. the avoidance action of the information providing vehicle 10). In the certainty level calculation process, such the uploaded data are used to calculate a certainty level of the impediment event detected by the event detection unit 50.

The certainty level is calculated based on the number, a rate, and contents of the uploaded data regarding the determination-target event. For example, when a data indicating the avoidance action is uploaded from the information providing vehicle 10 running at a certain location, it is possible to estimate that some impediment event is occurring at the certain location. When lots of data indicating the same kind of avoidance action are uploaded from a large number of information providing vehicles 10, it is possible to judge that an existing probability of the impediment event is high. As a rate of the avoidance action taken by the information providing vehicles 10 running at the certain location becomes higher, the existing probability can be judged to be higher. If the uploaded data include a data that identifies the impediment event itself such as a separated wheel and a disabled vehicle, it is possible to judge that the impediment event is almost certainly occurring at that location.

As to the stress event such as the tailgating vehicle and the manner violation vehicle, the certainty level can be calculated based on the number, rate, contents of the uploaded data. For example, when lots of uploaded behavior data regarding a certain vehicle indicate a tailgating behavior, it is possible to judge that the certain vehicle is probably the tailgating vehicle. As the rate of the tailgating behavior by the certain vehicle becomes higher, it is possible to judge that the probability that the certain vehicle is the tailgating vehicle is higher. When the tailgating behavior itself is detected by an on-vehicle camera and the like, it is possible to judge that the certain vehicle is almost certainly the tailgating vehicle.

In this manner, the certainty level of the impediment event detected by analyzing a large number of data can be calculated based on the number of data suggesting its presence, the rate of data suggesting its presence, and the contents of the data. The event information calculation unit 74 holds a calculation rule (function or map) for calculating the certainty level depending on parameters including the number, rate, and contents of uploaded data, with respect to each impediment event. According to the calculation rule, the certainty level is calculated to be a higher value as an existing probability of the impediment event being the determination-target becomes higher.

The certainty level calculated by the event information calculation unit 74 is provided to a notification decision unit 60. In addition to the certainly level, the data of the unexpected event that is judged by the unexpected event determination unit 54 and the data of the stress event that is judged by the stress event determination unit 56 also are supplied to the notification decision unit 60. Based on the certainly level of the event, the notification decision unit 60 performs a notify/not-notify process that is a final judgment on whether or not to execute notifying. If it is judged to execute notifying, then an HMI specification determination process that determines how to perform the notifying is executed based on the certainty level of the event.

More specifically, in the notify/not-notify process, it is judged whether the certainty level of the impediment event being the determination-target is high enough to deserve to provide the euphemistic notification. Although the euphemistic notification is the notification provided with respect to the impediment event whose certainty level is low, it is preferable not to provide the notification at a stage when the certainty level is too low. The notify/not-notify process is for eliminating the notification at such the stage.

In the HMI specification determination process, whether to adopt the straightforward notification or the euphemistic notification is determined based on the certainty level of the impediment event. More specifically, if the certainty level is sufficiently high, then the straightforward notification is selected as the method of notifying. On the other hand, if the certainty level is not yet high enough, the euphemistic notification is selected as the method of notifying.

The center 44 is provided with a straightforward database used for generating the straightforward notification and an euphemistic database used for generating the euphemistic notification. Data for generating the notification (message) for each of possible impediment events are recorded in these databases.

According to the present embodiment, the euphemistic notification is designed to include words of wisdom or lines by a real or imaginary person or character. More specifically, the words of wisdom or lines include a quote from anime (animated cartoons), movies, dramas, speeches, or buzzwords. The famous words of wisdom or lines are often remembered together with voice of the person or character who says them, a scene where they are said, a BGM (Back Ground Music) played at the scene, and the like, which forms a specific perspective of the world. The euphemistic notification may be designed to include light/sound effects reminiscent of the perspective of the world in addition to the above-mentioned words of wisdom or lines.

In the euphemistic database, each euphemistic notification is recorded and associated with the impediment event that can be associated from the contents or the perspective of the euphemistic notification. As an example, let us consider a case where a theme of the euphemistic notification is the anime "MOBILE SUIT GUNDAM" and quotes from the anime are used. In this case, lines of the euphemistic notification are recorded in the euphemistic database and associated with the impediment event as follows.

(Example 1) "I see them! I can see the enemy!" (voice of Char Aznable), as a notification suggesting an unknown forward obstacle.

(Example 2) "One must always plan a few steps ahead in battle" (voice of Char Aznable), as a notification suggesting an obstacle appearing around a blind curve.

(Example 3) "At times like these, he who rushes . . . loses" (voice of Kai Shiden), as a notification suggesting a tailgating vehicle or a manner violation vehicle.

As another example, let us consider a case where a theme of the euphemistic notification is the movie "STAR WARS". In this case, lines of the euphemistic notification are recorded in the euphemistic database and associated with the impediment event as follows.

(Example 1) "Feel . . . don't think " (words of QUI GON JINN when instructing OBI-WAN KENOBI), as a notification suggesting approach of an emergency vehicle.

(Example 2) "I got a bad feeling about this" (words of HAN SOLO), as a notification suggesting various kinds of unexpected event.

(Example 3) "Remember, the Force will be with you, always" (words of OBI-WAN KENOBI), as a notification suggesting a manner violation vehicle or a tailgating vehicle.

If the final judgment is to provide the straightforward notification, then the notification decision unit 60 generates, based on the data recorded in the straightforward database, the straightforward notification that notifies the driver of the impediment event in a straightforward manner. On the other hand, if the final judgment is to provide the euphemistic notification, the notification decision unit 60 generates, based on the data recorded in the euphemistic database, the euphemistic notification that notifies the driver of the impediment event in an euphemistic manner. Furthermore, the notification decision unit 60 may generate, as appropriate, an instruction of the avoidance control to be performed in the assisted vehicle 24 in order to avoid the impediment event.

The straightforward notification or the euphemistic notification and the instruction of the avoidance control generated by the notification decision unit 60 are supplied to the assisted vehicle 24 through the communication unit 62. When receiving them, the assisted vehicle 24 executes a necessary avoidance control in the control unit 40 and uses the vehicle HMI unit 42 to provide the driver with the straightforward notification or the euphemistic notification.

[Operation in First Embodiment]

Figure 5:
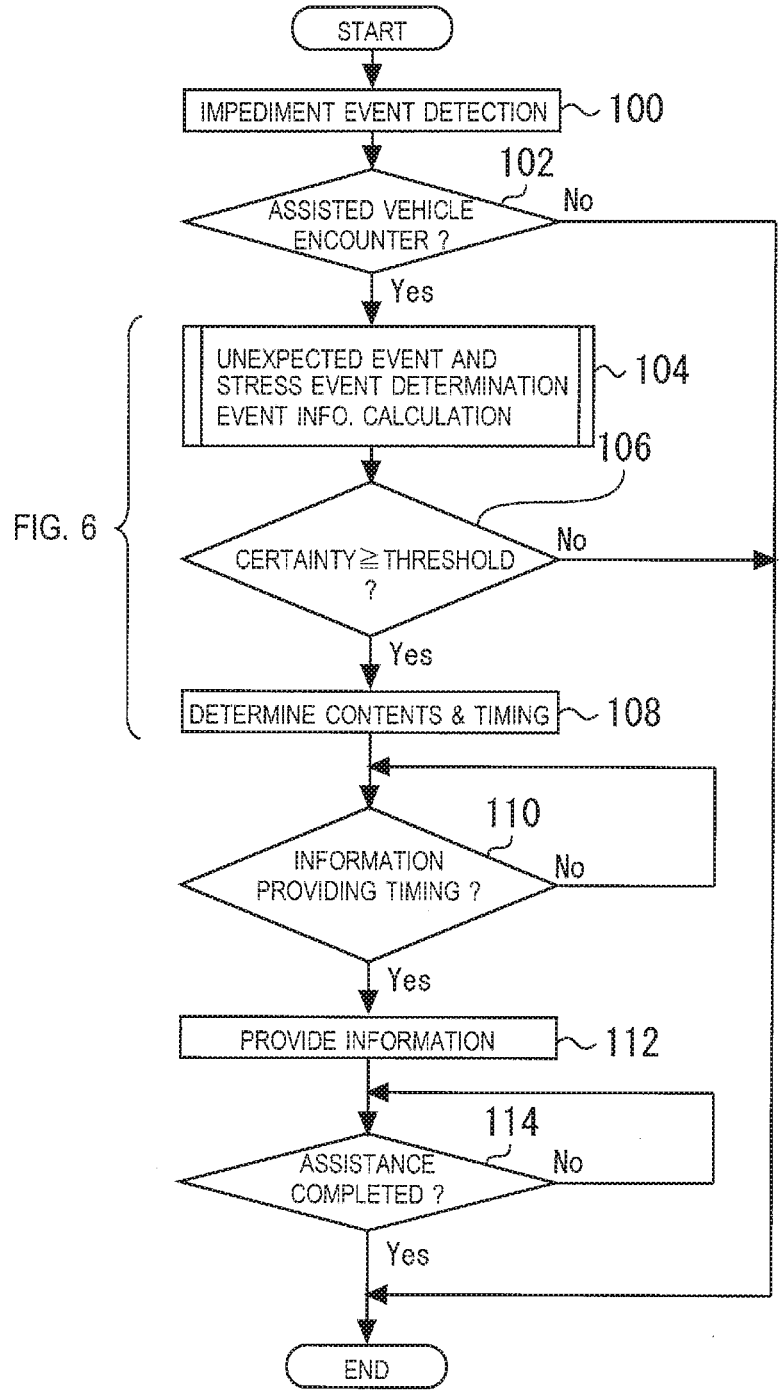
FIG. 5 is a flow chart for explaining an overview of processes executed in a center shown in FIG. 4.

FIG. 5 is a flow chart for explaining an overview of processes executed in the center 44 in the first embodiment of the present invention. It should be noted that the process of recording the uploaded data from the information providing vehicle and the like in the traffic information database 48 is executed separately from a routine shown in FIG. 5.

In the routine shown in FIG. 5, a process of detecting the impediment event is first executed (Step 100). More specifically, an event that is potentially the unexpected event or the stress event is detected based on the data recorded in the traffic information database 48. The process at the present Step 100 corresponds to the above-mentioned (1) and (2) processes executed by the event detection unit 50 shown in FIG. 4.

After the event that is potentially the impediment event is detected, whether or not the assisted vehicle 24 potentially encounters the detected impediment event is determined (Step 102). More specifically, a location of the impediment event is first identified based on the positional information recorded in the traffic information database 48. Next, a travel route of the assisted vehicle 24 is estimated based on the uploaded data from the assisted vehicle 24. If the travel route of the assisted vehicle 24 potentially overlaps the location of occurrence of the impediment event, the determination at the present Step 102 results in "YES". These processes correspond to the above-mentioned (3) to (5) processes executed by the event detection unit 50 shown in FIG. 4.

If the determination at Step 102 results in "NO", then the processing in the current cycle is ended and the process of the above-mentioned Step 100 is started again. On the other hand, if it is judged that the impediment event detected in the current cycle is potentially encountered by the assisted vehicle 24, then the processes by the unexpected event determination unit 54, the stress event determination unit 56 and the event information calculation unit 74 are executed (Step 104). More specifically, the following three processes are executed here.

1. determining whether or not the impediment event detected in the current cycle corresponds to the unexpected event that is to be notified to the driver.

2. determining whether or not the impediment event detected in the current cycle corresponds to the stress event that is to be notified to the driver.

3. calculating the certainty level of the impediment event detected in the current cycle.

Figure 6:
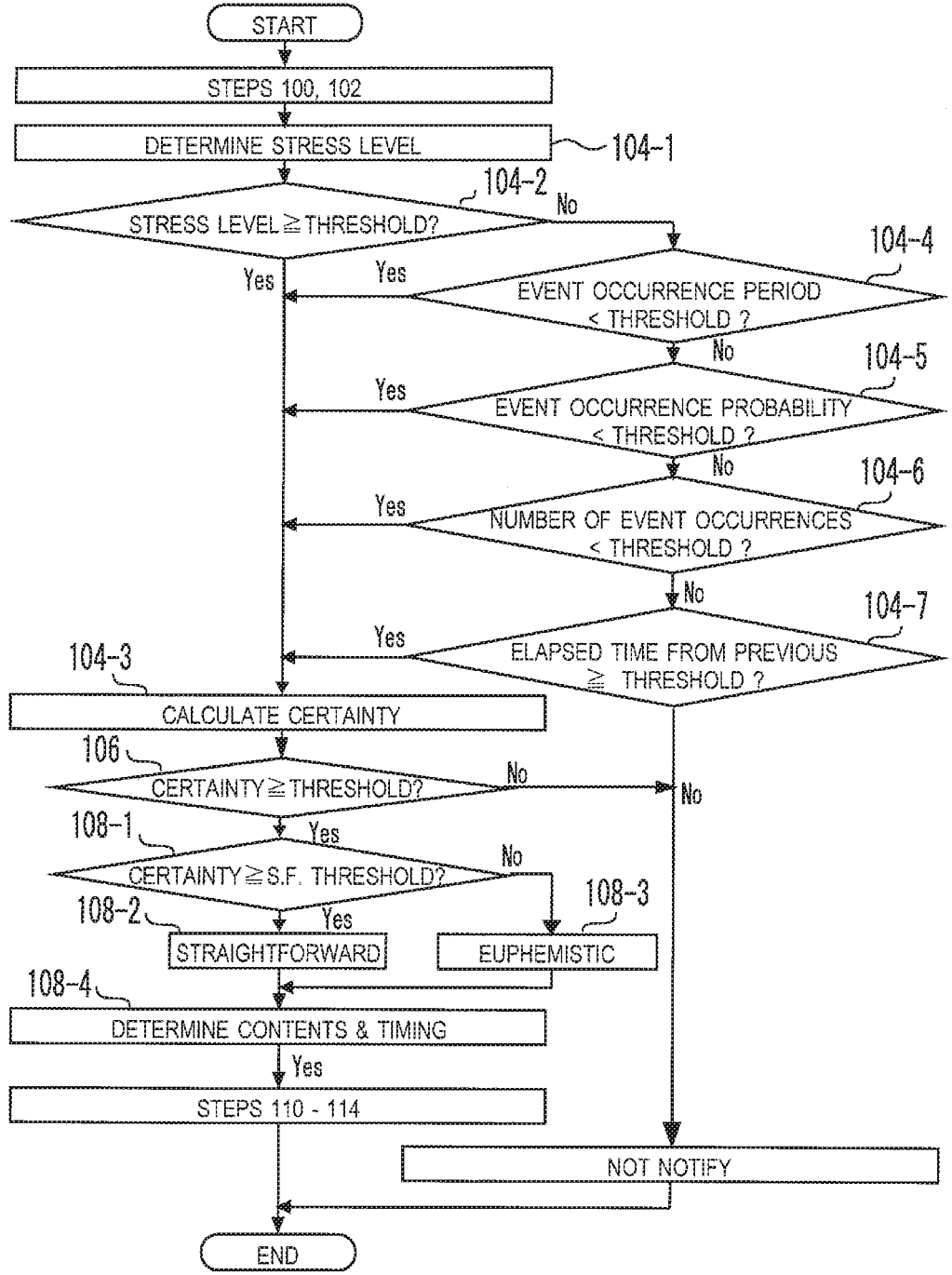
FIG. 6 is a flow chart for explaining details of Steps 104 to 108 shown in FIG. 5.

FIG. 6 is a flow chart for explaining the details of the above-mentioned Step 104. As shown in FIG. 6, the stress level of the impediment event being the determination-target is first determined (Step 104-1). As described above, various rules (maps and the like) for calculating the stress level for each impediment event are stored in the center 44. The stress level of the impediment event is determined according to the rule.

After the process at Step 104-1 is completed, it is determined whether or not the determined stress level is equal to or greater than the threshold for determining notification necessity (Step 104-2). As described above, the threshold of the stress level for each impediment event is stored in the center 44. At the present Step 104-2, the above-mentioned stress level is compared with the threshold for the impediment event being the determination-target.

If it is determined that the stress level is equal to or greater than the threshold, it is possible to judge that the impediment event being the determination-target corresponds to the stress event that should be notified to the driver. In this case, the certainty level of the impediment event is calculated (Step 104-3). More specifically, the following processes are executed here.

1. counting the number of the uploaded data regarding the target impediment event.
2. calculating the rate of uploads of the data regarding the target impediment event from the information providing vehicles 10 passing through the location of occurrence of the target impediment event.
3. counting the number of uploads of data sufficient for identifying the contents of the target impediment event.
4. multiplying the results of the above-mentioned processes 1 to 3 by preset weighting coefficients, respectively.
5. calculating a sum of the respective results of the above-mentioned process 4 as the certainty level.

If there exists an impediment event, the number and rate of the data suggesting its existence increase as time proceeds. Moreover, information enough to confirm the existence of the impediment event is expected to be uploaded. On the other hand, if no impediment event exists, such the data is not uploaded so much even with the passage of time. Therefore, according to the processing in Step 104-3, it is possible to calculate the certainty level that converges to the existing probability of the impediment event as time proceeds.

If it is determined at the above-mentioned Step 104-2 in the routine shown in FIG. 6 that the stress level of the target impediment event is less than the threshold, then it is determined whether or not the target impediment event satisfies a first condition of the low frequency event, namely, a condition that "the period of event occurrence within a defined period of time is less than a threshold" (Step 104-4). In the center 44, statistical processing with regard to the time of occurrence of the impediment event is performed based on the large amount of data accumulated. The above-mentioned "defined period of time" is exemplified by one year, one month, one week, and so forth. The above-mentioned "threshold" is set in consideration of the "defined period of time" and is set to be sufficiently shorter than the "defined period of time". If the target impediment event is the one that occurs in a limited period (specific season, period, or hour, for example) within the defined period of time, it is determined in the present Step 104-4 that the above-mentioned first condition is satisfied.

If it is determined that the first condition is satisfied, it is possible to judge that the target impediment event corresponds to the low frequency event that should be notified to the driver. In this case, the certainty level is calculated at Step 104-3 thereafter. On the other hand, if it is determined that the above-mentioned first condition is not satisfied, then it is determined whether or not the target impediment event satisfies a condition of the low probability event (Step 104-5). More specifically, it is first determined whether or not the target impediment event occurs in an on-road fixed object belonging to a population being a group of the same kind of objects. If the determination results in "YES", then it is determined whether or not a probability of the on-road fixed object causing the impediment event is less than a threshold. The threshold is an upper limit value of a range of the probability in which a general driver has a preconceived idea that the on-road fixed object seldom causes the impediment event. For example, the threshold is set to 10%, 5%, 3%, or 1%.

If the determination at the above-mentioned Step 104-5 results in "YES", it is possible to judge that the target impediment event corresponds to the low probability event that should be notified to the driver. In this case, the process of Step 104-3 is executed thereafter. On the other hand, if the determination at Step S104-5 results in "NO", then it is determined whether or not the target impediment event satisfies a second condition of the low frequency event, namely, a condition that "the number of event occurrences within a defined period of time is less than a threshold" (Step 104-6). In the center 44, statistical processing with regard to the number of occurrences of the impediment event is performed based on the large amount of data accumulated. The above-mentioned "defined period of time" is exemplified by one year, one month, one week, and so forth. The above-mentioned "threshold" is set in consideration of the "defined period of time" and is set to be one to several times.

If it is determined at the above-mentioned Step 104-6 that the above-mentioned second condition is satisfied, it is possible to judge that the target impediment event is not the one occurring routinely but corresponds to the low frequency event that should be notified to the driver. In this case, the process of Step 104-3 is executed thereafter. On the other hand, if the determination at Step S104-6 results in "NO", then it is determined whether or not the target impediment event satisfies a third condition of the low frequency event, namely, a condition that "an elapsed time from the previous occurrence at the location of occurrence is equal to or more than a threshold" (Step 104-7). The location, date and time of occurrence of individual impediment event are recorded in the center 44. The above-mentioned determination at Step 104-7 is made based on such the record. The threshold used in the present Step 104-7 is exemplified by several years, one year, one month, and so forth.

If the determination at the above-mentioned Step 104-7 results in "YES", it is possible to judge that the target impediment event corresponds to the low frequency event that should be notified to the driver. In this case, the process of Step 104-3 is executed thereafter. On the other hand, if the determination at Step S104-7 results in "NO", it is possible to judge that the target impediment event is not the event that should be notified to the driver. In this case, the center 44 makes a decision that the event is not to be notified, and then ends the processes of the current cycle.

In the routine shown in FIG. 6, after the certainty level of the impediment event is calculated at Step 104-3, it is determined next whether or not the calculated certainty level is equal to or greater than an assistance threshold (Step 106). This process corresponds to the above-mentioned notify/not-notify process executed by the notification decision unit 60. Here, the assistance threshold is a minimum certainty level (for example, 30%) that is required for providing the driver of the assisted vehicle 24 with the euphemistic notification. If the certainty level of the impediment event is less than the assistance threshold, then it is determined that the impediment event is "not-to-be-notified", because the possibility that the notification results in misinformation is too high. In this case, the processes of the current cycle are ended quickly.

On the other hand, if it is determined at the above-mentioned Step 106 that the certainty level of the impediment event is equal to or greater than the assistance threshold, it is possible to judge that the impediment event deserves to be notified, even though the notification may result in misinformation. In this case, it is determined next whether or not the certainty level is equal to or greater than a straightforward notification threshold (Step 108-1). Here, the straightforward notification threshold is a minimum certainty level (for example, 70%) required for judging that the presence of the impediment event is almost certain and it is suitable to make a definitive statement to call the attention of the driver of the assisted vehicle 24.

In the routine shown in FIG. 6, if it is determined at Step 108-1 that the certainty level is equal to or greater than the straightforward notification threshold, the above-described straightforward notification is selected as the method of notifying (Step 108-2). On the other hand, if it is determined that the certainty level is less than the straightforward notification threshold, the above-described euphemistic notification is selected as the method of notifying (Step 108-3).

After the above-mentioned processes are completed, then a process of determining assistance contents and an assistance timing is performed (Step 108-4). More specifically, when the straightforward notification is selected, the straightforward notification associated with the impediment event is generated based on the data recorded in the straightforward database and an instruction of a necessary avoidance control is generated. When the euphemistic notification is selected, the euphemistic notification associated with the impediment event is generated based on the data recorded in the euphemistic database and an instruction of a necessary avoidance control is generated. Moreover, an appropriate timing of providing the notification is determined based on a distance between the present location and the location of occurrence of the impediment event, a speed of the assisted vehicle 24, and so forth.

After the above-mentioned processes are completed, processes of Step 110 and thereafter shown in FIG. 5 are executed. It is first determined whether or not the timing of providing the notification comes (Step 110). This process is executed repeatedly until the timing comes. When the timing comes, the notification and information required for the avoidance control are provided from the center 44 to the assisted vehicle 24 (Step 112). After that, the center 44 executes and completes the other processes necessary for the assistance (Step 114), and then ends the processes of the current cycle.

According to the system of the present embodiment, as described above, it is possible to appropriately notify the assisted vehicle 24 of only the information regarding the impediment event that the driver finds useful. Moreover, according to the present system, it is possible to notify the information on the impediment event whose certainty level is low in an euphemistic manner with amusement. Therefore, according to the present system, it is possible to fully provide the driver of the assisted vehicle 24 with the notification useful for continuing safety driving of the assisted vehicle 24, without annoying the driver.

In the above description, the processes from Step 100 to Step 114 are executed in series. However, the method of executing the processes is not limited to that. The processes can be executed in a different order or in parallel, depending on specification of hardware.

[Modification Examples of First Embodiment]

By the way, in the first embodiment described above, all the processes for determining the contents and timing of the notification are performed on the side of the center 44. Instead, a part of the processes may be performed on the side of the assisted vehicle 24.

In the first embodiment described above, no additional process is performed when the euphemistic notification results in misinformation. Instead, an additional notification explaining that the misinformation has been issued may be provided by using words of wisdom or lines.

For example, when the theme of the euphemistic notification is the anime "Mobile Suit Gundam", the additional notification may be as follows.

"No one likes to admit to them . . . To the mistakes caused by their youth" or "It doesn't matter as long as it doesn't hit you" (voice of Char Aznable)

By the way, in the first embodiment described above, the processor, the storage device, the communication device and so forth of the center 44 constitute the "data processing device" in the first embodiment. Moreover, in the first embodiment, the frequency of occurrence, the probability of occurrence, and the stress level of the impediment event correspond to the "notification necessity level" in the fifth embodiment.

Second Embodiment

[Configuration of Second Embodiment]

Figure 7:
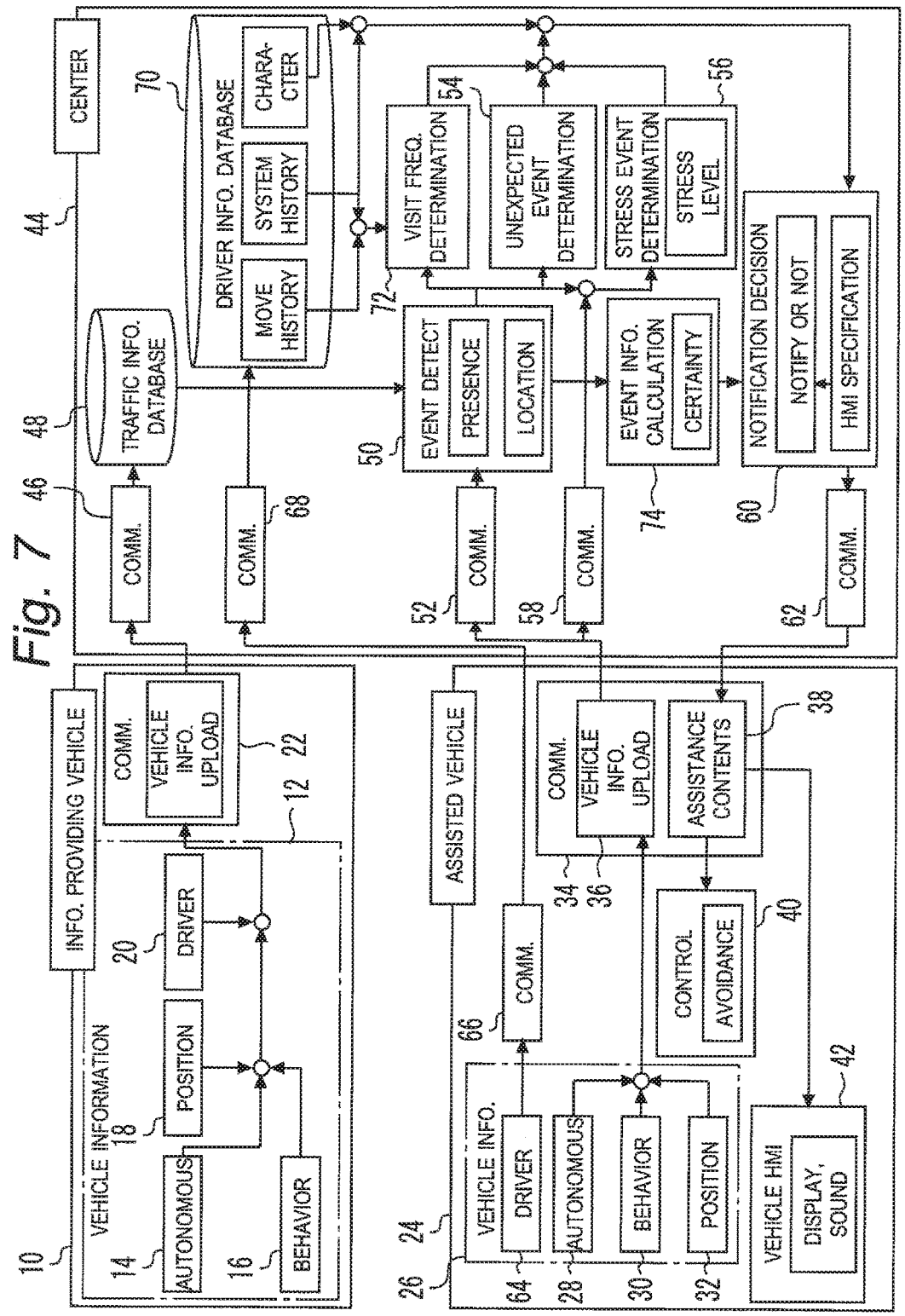
FIG. 7 is a block diagram for explaining a configuration of a second embodiment of the present invention.

FIG. 7 is a diagram for explaining a configuration according to a second embodiment of the present invention. In FIG. 7, the same components as in FIG. 4 are given the same reference numerals, and an overlapping description thereof will be omitted as appropriate. In the present embodiment, the vehicle information unit 26 of the assisted vehicle 24 includes a driver information unit 64. As in the case of the driver information unit 20 of the information providing vehicle 10, the driver information unit 64 includes an input interface for receiving driving skill information self-reported by the driver or a unit for diagnosing the driving skill, and an input interface for receiving various settings and requests from the driver.

The information obtained by the driver information unit 64 is uploaded to the center 44 through a communication unit 66. The center 44 has a communication unit 68 for receiving the uploaded information and a driver information database 70 for storing the uploaded information.

A movement history of the assisted vehicle 24 is recorded in the driver information database 70. The movement history includes a history regarding the vehicle position and time when the vehicle is running. Moreover, a system operation history is recorded in the driver information database 70. The system operation history includes information such as contents, date and time of the notification regarding the impediment event and the avoidance control that have been provided to the assisted vehicle 24. Furthermore, information of driver characteristics is recorded in the driver information database 70. The driver characteristics include information such as the various settings and requests from the driver of the assisted vehicle 24 and the driving skill of the driver.

The information of the movement history recorded in the driver information database 70 is supplied to a visit frequency determination unit 72. The information of the impediment event detected by the event detection unit 50, that is, the event being potentially the unexpected event or the stress event also is supplied to the visit frequency determination unit 72. The visit frequency determination unit 72 extracts, from the impediment event, an event that corresponds to the unexpected event for the driver because a frequency of visit by the driver to the location of occurrence of the event is low.

More specifically, the event extracted by the visit frequency determination unit 72 corresponds to the "regular event" and the "hour event" shown in FIG. 3. These events occur comparatively frequently and thus correspond to neither the low frequency event nor the low probability event. Therefore, the unexpected event determination unit 54 may not extract these events as the event to be notified. When the location of occurrence of the "regular event" or the "hour event" being the determination-target is outside the living area of the driver of the assisted vehicle 24, the visit frequency determination unit 72 extracts the determination-target event as the unexpected event. Moreover, when the "hour event" being the determination-target occurs during the off-activity hour of the assisted vehicle 24, the visit frequency determination unit 72 extracts the determination-target event as the unexpected event, even when the location of occurrence of the determination-target event is within the living area of the driver (see columns attached with (I) in FIG. 3).

In FIG. 7, the information of the movement history stored in the driver information database 70 is supplied to the visit frequency determination unit 72. This information can be supplied also to the unexpected event determination unit 54. As described above, the unexpected event determination unit 54 extracts the low probability event as the unexpected event. The low probability event is unexpected for a driver who has a preconceived idea that the specific on-road fixed object causes the impediment event with an extremely low probability. In another word, the low probability event is an expected impediment event for a driver who does not have such the preconceived idea. Here, a driver whose living area does not overlap an installation site of the on-road fixed object causing the low probability event does not know the characteristic feature of the on-road fixed object and thus does not have the above-mentioned preconceived idea. Therefore, it is also possible in the present embodiment that when the location of occurrence of an event detected as the low probability event is outside the living area of the driver of the assisted vehicle 24, the unexpected event determination unit 54 excludes the event from the unexpected event (see "expected" indicated in the right bottom column shown in FIG. 3).

Data of the unexpected event extracted by the visit frequency determination unit 72 as well as the events extracted by the unexpected event determination unit 54 and the stress event determination unit 56 are supplied to the notification decision unit 60. In the present embodiment, the information regarding the system operation history and the characteristics of the driver recorded in the driver information database 70 is supplied to the notification decision unit 60.

The notification decision unit 60 judges, based on the system operation history, whether or not there is a history that the event received from the unexpected event determination unit 54 and the like has been already notified to the assisted vehicle 24. If it is judged that there is such the history of notification, the notification decision unit 60 further calculates an elapsed time from the notification time to the current time. If the elapsed time is less than a predetermined threshold, the notification decision unit 60 treats this event as "not-to-be-notified". As a result of this processing, it is possible according to the system of the present embodiment to prevent the notification regarding the same impediment event from being provided repeatedly to the driver of the assisted vehicle 24 within a short period of time.

Moreover, the notification decision unit 60 can change the threshold used for making a final judgment of notification, based on the driver characteristics such as the various settings and requests from the driver and the driving skill of the driver that are recorded in the driver information database 70. Regarding the unexpected event extracted by the visit frequency determination unit 72, the frequency of visit by the driver is calculated as a parameter representing the notification necessity level. Regarding the unexpected event extracted by the unexpected event determination unit 54, the frequency of occurrence or the probability of occurrence of the event is calculated as the parameter. Regarding the stress event extracted by the stress event determination unit 56, the stress level is calculated as the parameter. The notification decision unit 60 compares the parameter with the threshold to make a final judgment on the notification. For example, the notification decision unit 60 changes the threshold such that more events are to be notified to the driver as the driver desires more notifications. As another example, the notification decision unit 60 changes the threshold such that more events are treated as "not-to-be-notified" as the driving skill of the driver becomes higher. As a result of these processes, it is possible to achieve a notification rule appropriate to the settings and requests from the driver and the driving skill of the driver.

[Feature of Second Embodiment]

In the system of the present embodiment, plural sets of data of the euphemistic notification are recorded in the euphemistic database of the center 44. Each set of data includes the euphemistic notifications associated with all the possible impediment events, respectively. Therefore, by using only a single set of data, it is possible to provide the assisted vehicle 24 with the euphemistic notification regarding any impediment event. The plural sets of data are organized by title or program of anime, movies, dramas, speeches, or buzz-words.

By using the driver information unit 64, the driver of the assisted vehicle 24 can upload a desired theme regarding the euphemistic notification. The uploaded desired theme is recorded as the driver's characteristics in the driver information database 70. Then, the notification decision unit 60 reads the set of data associated with the desired theme from the euphemistic database and can generate the euphemistic notification by using the read set of data. Thus, according to the system of the present embodiment, the notification regarding the impediment event whose certainty level is low can be provided by using the euphemistic notification with the perspective of the world desired by the driver. As a result, according to the system of the present embodiment, it is possible to give further high level of amusement to the euphemistic notification, as compared with the case of the first embodiment.

[Modification Examples of Second Embodiment]

In the second embodiment described above, the euphemistic notification provided in the assisted vehicle 24 is generated by the notification decision unit 60 of the center 44. However, the method of generation is not limited to that. For example, it is also possible that the set of the data associated with the driver's desired theme is downloaded to a storage device in the assisted vehicle 24 and the euphemistic notification is generated on the side of the assisted vehicle 24.

What is claimed is:
1. An information providing apparatus for a vehicle, comprising:
   a memory comprising a traffic information database in which traffic information data is recorded; and
   a processor configured to:
   detect, based on the stored traffic information data, an impediment event that potentially impedes running of the vehicle;
   extract the impediment event potentially encountered by the vehicle;
   accumulate, in the memory, a total number of extracted impediment events for the same impediment event;

calculate a certainty level of the impediment event that corresponds to a probability of occurrence based at least in part on the accumulated total number of extracted impediment events that correspond to the same impediment event;

when the certainty level of the same impediment event is greater than or equal to a straightforward threshold notification, provide a driver with a first type of notification that is a straightforward notification regarding the same impediment event potentially encountered by the vehicle; the straightforward notification representing presence and contents of the impediment event in a straightforward manner; and when the certainty level of the same impediment event is not greater than or equal to the straightforward notification threshold, provide the driver with a second type of notification that is different from the first type of notification, the second type of notification being an euphemistic notification regarding the same impediment event potentially encountered by the vehicle, the euphemistic notification being based on an euphemistic representation reminiscent of the impediment event.

2. The information providing apparatus for the vehicle according to claim 1, wherein the processor is further configured to execute a traffic information recording process that records, in the traffic information database, traffic information data received from an information providing vehicle.

3. The information providing apparatus for the vehicle according to claim 2, wherein the traffic information data includes:
positional information of the information providing vehicle; and
vehicle behavior information of the information providing vehicle.

4. The information providing apparatus for the vehicle according to claim 2, wherein the traffic information data includes:
positional information of the information providing vehicle; and
a result of detection by a surrounding monitoring sensor that is installed in the information providing vehicle for monitoring a surrounding situation.

5. The information providing apparatus for the vehicle according to claim 1, wherein the processor is further configured to:
calculate a notification necessity level for each of a plurality of different impediment events, and
provide the driver with the straightforward notification and the euphemistic notification regarding any impediment event that has a calculated notification necessity level that is greater than a notification threshold.

6. The information providing apparatus for the vehicle according to claim 1, wherein
the euphemistic notification includes a phrase being words of wisdom or lines by a real or imaginary person or character and reminiscent of the impediment event to be notified.

7. The information providing apparatus for the vehicle according to claim 6, wherein
the words of wisdom or lines include a quote from anime, movies, dramas, speeches, or buzz-words.

8. The information providing apparatus for the vehicle according to claim 6, wherein
the memory further stores:

a straightforward database in which data of the straightforward notification for each of a plurality of impediment events are recorded; and
an euphemistic database in which data of the euphemistic notification for each of the plurality of impediment events are recorded,
the providing of the straightforward notification process includes:
reading, from the straightforward database, the data associated with the same impediment event to be notified; and
notifying the driver of the straightforward notification based on the read data, and
the providing of the euphemistic notification process includes:
reading, from the euphemistic database, the data associated with the impediment event to be notified; and
notifying the driver of the euphemistic notification based on the read data.

9. The information providing apparatus for the vehicle according to claim 8, wherein
in the euphemistic database, a set of the data of the euphemistic notification associated with the plurality of impediment events is recorded for each of a plurality of themes,
the processor is further configured to execute a reception process that receives a desired theme among the plurality of themes that is desired by the driver, and
the reading of the data associated with the impediment event includes reading the data associated with the same impediment event from the set of the data associated with the desired theme.

10. The information providing apparatus for the vehicle according to claim 9, wherein
the vehicle comprises a storage device configured to store the set of the data associated with the desired theme that is downloaded from the euphemistic database, and
the reading of the data associated with the impediment event associated with the desired theme and the notifying of the driver based on the read data are executed in the vehicle.

11. The information providing apparatus for the vehicle according to claim 1, wherein
the euphemistic notification includes the phrase being words of wisdom or lines by the real or imaginary person or character that are from a desired theme selected from the driver from a plurality of themes,
the selected desired theme is associated with one or more impediment events, and
the euphemistic notification is reminiscent of the impediment event to be notified.

12. The information providing apparatus for the vehicle according to claim 1, wherein the certainty level of the same impediment event being greater than or equal to a straightforward threshold notification corresponds to when the same impediment event is a same impediment event whose frequency of encounter by the driver is equal to or less than a certain level.

13. An information providing apparatus for a vehicle, comprising:
a memory including a traffic information database in which traffic information data is recorded; and
a processor configured to:
detect, based on the traffic information data, an impediment event that impedes vehicle running;
extract the impediment event potentially encountered by the vehicle;

a certainty level calculation process that calculates, based on the traffic information data, a certainty level of the impediment event;

a straightforward notification process that provides a driver with a straightforward notification regarding the impediment event potentially encountered by the vehicle and having the certainty level equal to or higher than a straightforward notification threshold; and an euphemistic notification process that provides the driver with an euphemistic notification, which is different from the straightforward notification, the euphemistic notification regarding the impediment event potentially encountered by the vehicle and having the certainty level less than the straightforward notification threshold, wherein the euphemistic notification includes a phrase being words of wisdom or lines by a real or imaginary person or character from a desired theme selected from the driver from a plurality of themes, the selected desired theme is associated with one or more impediment events, and the euphemistic notification is reminiscent of the impediment event to be notified.

14. The information providing apparatus for the vehicle according to claim 13, wherein
the vehicle comprises a storage device configured to store the set of the data associated with the desired theme that is downloaded from the euphemistic database, and
the reading of the data associated with the impediment event associated with the desired theme and the notifying of the driver based on the read data are executed in the vehicle.

15. A method comprising:

detecting, based on recorded traffic information data, an impediment event that potentially impedes running of a vehicle;

extracting the impediment event potentially encountered by the vehicle;

accumulating , in a memory, a total number of extracted impediment events for the same impediment event;

calculating, a certainty level of the impediment event that corresponds to a probability of occurrence based at least in part on the accumulated total number of extracted impediment events that correspond to the same impediment event;

when the certainty level of the same impediment event is greater than or equal to a straightforward threshold notification, providing a driver with a first type of notification that is a straightforward notification regarding the same impediment event potentially encountered by the vehicle, the straightforward notification representing presence and contents of the impediment event in a straightforward manner; and when the certainty level of the same impediment event is not greater than or equal to the straightforward notification threshold, providing the driver with a second type of notification that is different from the first type of notification, the second type of notification being an euphemistic notification regarding the same impediment event potentially encountered by the vehicle, the euphemistic notification being based on an euphemistic representation reminiscent of the impediment event.

* * * * *